W. H. RUNGE.
SAFETY DEVICE FOR CARRIAGE FEED MECHANISMS FOR LATHES OR THE LIKE.
APPLICATION FILED FEB. 4, 1915.
1,204,824.
Patented Nov. 14, 1916.
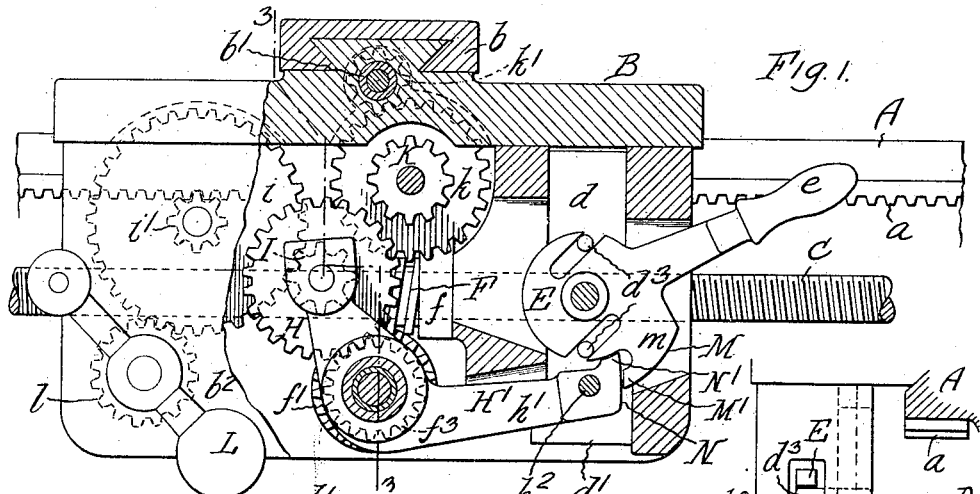
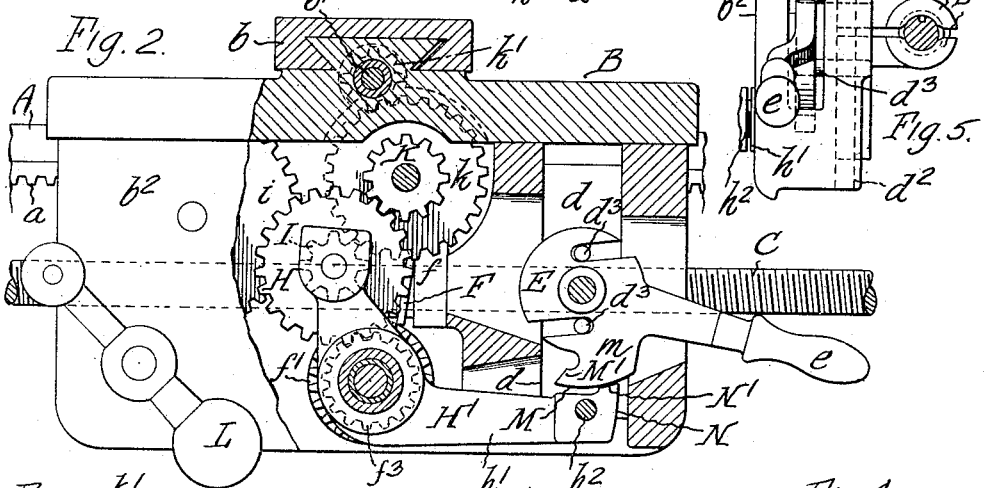
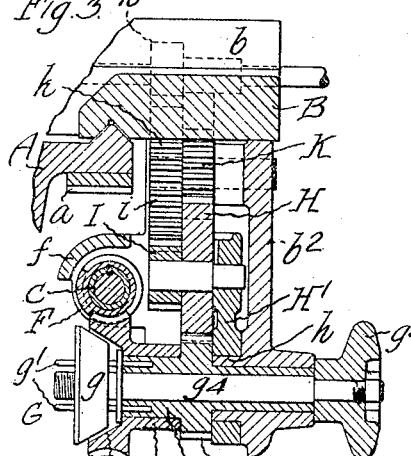
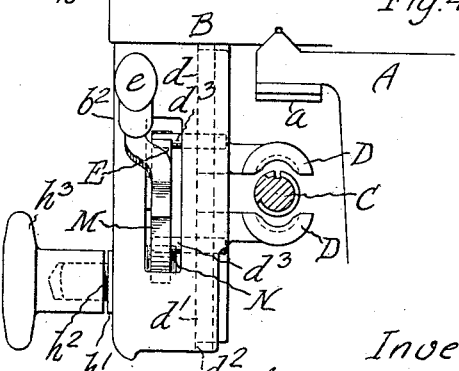
Inventor.
William H. Runge,
by Wilhelm Parker,
Attorneys.
Witnesses

UNITED STATES PATENT OFFICE.

WILLIAM H. RUNGE, OF SENECA FALLS, NEW YORK, ASSIGNOR TO THE SENECA FALLS MANUFACTURING COMPANY, OF SENECA FALLS, NEW YORK.

SAFETY DEVICE FOR CARRIAGE-FEED MECHANISMS FOR LATHES OR THE LIKE.

1,204,824.   Specification of Letters Patent.   Patented Nov. 14, 1916.

Application filed February 4, 1915. Serial No. 6,061.

*To all whom it may concern:*

Be it known that I, WILLIAM H. RUNGE, a citizen of the United States, residing at Seneca Falls, in the county of Seneca and State of New York, have invented a new and useful Improvement in Safety Devices for Carriage-Feed Mechanisms for Lathes or the like, of which the following is a specification.

This invention relates to feed mechanisms for the tool carriages of lathes or the like, and more particularly to mechanisms of this kind in which the tool carriage is adapted to be moved lengthwise of the lathe bed, either by means of a screw drive comprising a nut engaging the threads of the lead screw, or by means of a gear drive actuated by the lead screw or by a feed rod and including suitable gearing engaging a stationary rack.

The object of the invention is to produce an inexpensive and reliable safety device of improved construction for preventing the placing of both the screw drive and the gear drive into action at the same time.

In the accompanying drawings: Figures 1 and 2 are front elevations of the tool carriage provided with a safety device embodying the invention, showing the parts in different positions, and having the apron partly broken away to expose the parts in rear thereof. Fig. 3 is a transverse sectional elevation of the tool carriage on line 3—3, Fig. 1. Figs. 4 and 5 are end elevations of the tool carriage showing the parts in different positions.

A represents a portion of the bed of the lathe having a toothed rack $a$ secured thereto, B the tool carriage which is movable lengthwise of the lathe bed, $b$ the transversely movable part or cross slide of the tool carriage which is actuated by means of a feed screw $b'$, and $b^2$ the apron or front wall of the tool carriage. C represents the usual power-driven feed shaft or lead screw which is adapted to transmit movement to the carriage from any suitable driving means, not shown. All of these parts may be of any usual or suitable construction and constitute no part of this invention.

The tool carriage B may be driven directly from the lead screw C by suitable mechanism, for example, by means of a screw-threaded feed nut consisting of two halves or sections D D carried by slides $d$ $d'$ which are confined in ways $d^2$ on the carriage and which are provided with pins $d^3$ $d^3$ extending into slots in a cam lever or actuating member E pivoted on the apron $b^2$. The cam lever has a handle portion $e$ which extends beyond the end of the tool carriage and which, when swung in one direction, causes the two nut sections to move into operative engagement with the thread on the feed screw for causing the carriage to be moved longitudinally when the feed screw is revolved, and when swung in the other direction moves the nut sections out of engagement with the screw.

The gearing for moving the carriage longitudinally and for actuating the cross slide or transversely movable portion of the tool carriage may be of any desired construction, that shown being constructed as follows: F represents the usual worm which is journaled and held from endwise movement on the carriage in a bearing $f$ thereon. The worm loosely surrounds the feed shaft and is splined thereto so that the worm will be turned by the shaft but can move longitudinally thereon in the travel of the carriage. The worm drives a worm wheel $f'$ having a hub $f^2$ which is suitably journaled to turn concentrically with a gear $f^3$ and adapted to be operatively connected with the gear $f^3$ by means of a clutch G. The clutch shown comprises a friction disk $g$ slidably mounted on pins or arms $g'$ secured to an extension or hub $g^2$ of the gear $f^3$ and adapted to be moved lengthwise relatively to the gear and to turn therewith. The friction disk is adapted to be moved into engagement with a corresponding friction face $g^3$ on the worm wheel $f'$ by means of a screw shaft $g^4$ engaging the disk $g$ and which is provided at its outer end with a handle $g^5$ by means of which the clutch can be actuated. The gear $f^3$ engages with a gear H which is mounted on a plate or gear carrier H' pivoted concentrically with the gear $f^3$ on a hub or boss of the apron of the tool carriage. This gear carrier has a longitudinally extending arm $h'$ provided with a forwardly projecting pin or rod $h^2$ having a screw knob or handle $h^3$ of any suitable construction for shifting the gear carrier H' and for locking the plate in the desired position. The gear H is rigidly connected to a pinion I which is adapted to mesh with a gear $i$ when the gear carrier H' is in the position shown in Fig. 1. The gear $i$ is rigidly connected to a pinion $i'$ engaging the rack $a$, so that when the gear carrier H' is in this position the carriage will be fed lengthwise of the lathe bed by the gear drive described. When the gear carrier H' is shifted to its other position, as shown in Fig. 2, the gear H meshes with a pinion K rigidly connected with a gear $k$ which in turn meshes with a gear $k'$ secured on the cross feed screw $b'$. By means of the mechanism described the carriage can be moved longitudinally by means of the gear drive when the arm $h'$ of the gear carrier H' is in its upper position, as shown in Fig. 1, and the cross slide $b$ can be actuated by the gear drive when the arm $h'$ of the gear carrier H' is in its lower position, as shown in Fig. 2. In either position of the gear carrier H', the connection between the worm wheel $f'$ and the gears for actuating the longitudinal or transverse feeds is controlled by the clutch G. L represents the usual crank or handle having a gear $l$ secured thereto which meshes with the gear $i$ for driving the carriage longitudinally by hand. All of these parts may be of any usual or desired construction.

In order to prevent the halves D D of the driving nut from being placed into engagement with the lead screw C at the same time that the gear feed is in operative position to feed the carriage longitudinally, and to prevent the longitudinal gear feed from being placed into operation while the halves D D of the feed nut are in engagement with the lead screw, the cam lever E, which operates the driving nut, is provided with an extension or portion $m$ having an outer guard face M which is substantially concentric with the pivot of the lever and which terminates in a stop or shoulder M'. The end of the arm $h'$ of the gear carrier H' is provided with a similar guard face N, which also terminates in a stop or shoulder N'. The shoulders M' and N' are so arranged relatively to the guard faces M and N that when the cam lever E is in the position shown in Fig. 2, in which the feed nut halves D D are in engagement with the lead screw, the shoulder N' will engage the guard face M and will prevent the gear carrier H' from being shifted into the position to cause the pinion I to engage the gear $i$ for actuating the carriage. When the feed lever is in the position shown in Fig. 1, in which the nut halves D D are out of engagement with the lead screw, the guard face M of the lever E will be out of operative relation to the shoulder N' of the arm $h'$ of the gear carrier, so that the arm $h'$ can be raised to shift the gear carrier H' into position to place the pinion I into engagement with the gear $i$. When the gear carrier is in this position, the lever E cannot be shifted back to its nut engaging position since the guard face N of the gear carrier is then in the path of movement of the shoulder M' of the lever. In this manner only one of the two longitudinal feeds of the tool carriage can be placed into operation at one time.

The construction recited provides a simple and inexpensive safety device and one in which two separate actions on the part of the operator are required to release one drive and place the other in engagement. It is, therefore, impossible in the construction shown to accidentally place one or another of the drive devices into operation by the same act which places another drive device out of operation, since each drive is placed into operation by a separate actuating member.

I claim as my invention:

1. In a lathe or the like, the combination of a tool carriage, a driven lead screw, a feed nut adapted to be connected with said lead screw, a cam lever for actuating said nut to place the same into operative relation to said screw, a train of gears for moving the carriage, a pivoted gear carrier adapted to be swung about its pivot to place said gear train into operative position to move the carriage and having an arm extending into proximity to said cam lever for swinging said gear carrier about its pivot, said cam lever having a guard face which extends into proximity to a stop on said arm when said cam lever is in a position in which the feed nut engages the feed screw to prevent the movement of said arm to place said gear train in operative position, and said arm having a guard face which is moved into proximity to a stop on said cam lever to prevent the feed nut from being placed into operative relation to said feed screw when said gear train is in operative position.

2. In a lathe or the like, the combination of a tool carriage, a driven lead screw, a feed nut adapted to be connected with said lead screw, a cam lever for actuating said nut to place the same into operative relation to said screw, a train of gears for moving the carriage, a pivoted gear carrier having an arm on which one of the gears of said train is mounted and a second arm which extends into proximity to said cam lever and by means of which said gear carrier is swung about its pivot to place the gear mounted thereon into and out of mesh with said train, said cam lever having a guard face which extends into proximity to said second arm when the cam lever is in a position in which the feed nut engages the feed screw, to prevent the movement of said second arm to place said gear into operative relation to said arm, and said second arm having a guard face which is moved into proximity to a stop on said cam lever to prevent the feed nut from being placed into operative relation to said feed screw when said gear is in mesh with said gear train.

3. In a lathe or the like, the combination of a tool carriage, a driven lead screw, a feed nut adapted to be connected with said lead screw, a cam lever having a disk provided with cam portions for actuating said nut to place the same into operative relation to said screw and having a guard face and a stop, a train of gears for moving the carriage, a pivoted gear carrier adapted to be swung about its pivot to place said gear train into operative position to move the carriage and having an arm extending into proximity to the guard face of said disk for swinging said gear carrier about its pivot, said arm having a stop and a guard face, the guard face of said cam disk being engaged by a stop on said arm to prevent the placing of the gear train into operative relation when said cam lever is in the position in which said nut is in operative relation to said screw, and said guard face of the arm being in a position to be engaged by the stop on the cam disk to prevent actuation of the cam lever when said arm is in a position to place said gear train into operative position.

Witness my hand, this 1st day of February, 1915.

WILLIAM H. RUNGE.

Witnesses:
JOHN C. DAVIS,
U. M. YOUNG.

Copies of this patent may be obtained for five cents each, by addressing the "Commissioner of Patents, Washington, D. C."